(12) United States Patent
Hamilton et al.

(10) Patent No.: US 9,443,116 B2
(45) Date of Patent: Sep. 13, 2016

(54) AUTHENTICATION IN A FLEXIBLE DISPLAY COMPUTING DEVICE

(71) Applicant: International Business Machines Corporation, Armonk, NY (US)

(72) Inventors: Jeffrey R. Hamilton, Pittsboro, NC (US); Ross L. Mickens, Cary, NC (US); Markesha F. Parker, Durham, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 154 days.

(21) Appl. No.: 14/295,221

(22) Filed: Jun. 3, 2014

(65) Prior Publication Data

US 2015/0347787 A1    Dec. 3, 2015

(51) Int. Cl.
| | |
|---|---|
| G06F 7/04 | (2006.01) |
| G06F 21/86 | (2013.01) |
| G06F 21/84 | (2013.01) |
| G06F 21/44 | (2013.01) |

(52) U.S. Cl.
CPC ............ *G06F 21/86* (2013.01); *G06F 21/44* (2013.01); *G06F 21/84* (2013.01); *G06F 2221/2129* (2013.01)

(58) Field of Classification Search
CPC ........ G06F 21/44; G06F 21/84; G06F 21/86; G06F 2221/2129; G06F 2221/2153
USPC .......................................................... 726/21
See application file for complete search history.

(56) References Cited

U.S. PATENT DOCUMENTS

| | | | | |
|---|---|---|---|---|
| 7,456,823 | B2* | 11/2008 | Poupyrev | ............... G06F 3/011 178/18.06 |
| 2010/0045705 | A1* | 2/2010 | Vertegaal | ........... A47G 19/2227 345/661 |
| 2012/0299814 | A1 | 11/2012 | Kwon et al. | |

(Continued)

FOREIGN PATENT DOCUMENTS

| | | |
|---|---|---|
| CN | 102129594 A | 7/2011 |
| EP | 2530941 A2 | 12/2012 |
| JP | 2008171148 A | 7/2008 |

OTHER PUBLICATIONS

Kao, et al., "Integrating Flexible Electrophoretic Display and One-Time Password . . . ", In Consumer Electronics.ICCE 2008. Digest of Technical Papers, pp. 1-2, IEEE, 2008.

(Continued)

*Primary Examiner* — Samson Lemma
(74) *Attorney, Agent, or Firm* — Steven M. Greenberg, Esq.; CRGO LAW

(57) ABSTRACT

Embodiments of the invention provide for device authentication in a flexible display computing device. In an embodiment of the invention, a method for device authentication in a flexible display computing device includes pre-storing in memory of a computing device, data corresponding to a pattern of folds of a flexible display of the computing device. The method also includes receiving a subsequent authentication request in the computing device and, in response, monitoring a folding of the flexible display and computing data corresponding to a pattern of the monitored folding. The method yet further includes comparing in the memory of the computing device the computed data to the pre-stored data. Finally, the method includes granting access to the computing device if the pattern of the monitored folding compares to the pattern of folds based upon a threshold degree of equality between the computed data and the pre-stored data.

15 Claims, 2 Drawing Sheets

(56) References Cited

U.S. PATENT DOCUMENTS

| | | | |
|---|---|---|---|
| 2012/0306910 A1* | 12/2012 | Kim | H04N 13/04 345/619 |
| 2013/0215011 A1 | 8/2013 | Ke | |
| 2013/0215041 A1* | 8/2013 | Kim | G06F 3/041 345/173 |
| 2013/0215088 A1* | 8/2013 | Son | G09G 5/40 345/204 |
| 2013/0265261 A1 | 10/2013 | Min | |
| 2014/0055344 A1* | 2/2014 | Seo | G06F 3/0487 345/156 |
| 2014/0078046 A1* | 3/2014 | Seo | G06F 1/1652 345/156 |

OTHER PUBLICATIONS

Maqsood, et al., "POSTER: Passwords on flexible display devices", In Proc. of the 2013 ACM SIGSAC Conf. on Computer and Comm. Security, pp. 1469-1472, ACM, 2013.

* cited by examiner

AUTHENTICATION IN A FLEXIBLE DISPLAY COMPUTING DEVICE

BACKGROUND OF THE INVENTION

1. Field of the Invention

The present invention relates to device authentication and more particularly to device authentication in a flexible display computing device.

2. Description of the Related Art

Device authentication refers to the testing of an identity of an end user of a device to ensure proper authorization of the end user to access the device. Traditional methods of performing device authentication include general password authentication in which an end user submits in response to a prompt a predetermined password in order to gain access to the device. More advanced forms of password authentication involve the submission of any combination of a user identifier, private key or passphrase in addition to one or more answers to one or more corresponding challenge questions. Even more advanced modes of device authentication involve biometric analysis in which the finger print, voice print or iris scan of an end user can be compared to a pre-stored print in order to assure the authorized access of a submitting end user.

Imagery has been incorporated previously in the device authentication process. Specifically, an image can be pre-stored by an end user and, during authentication, the pre-stored image can be provided to the end user so that the end user can be assured that the authentication system is genuine and not spoofed. Likewise, imagery has been incorporated into an authentication process by comparing a pre-stored image to that acquired by a device camera. To the extent the imagery matches, access to the device can be granted. Of course, acquiring an image that precisely matches a pre-stored image is not without its apparent complications.

Of note, new advancements in different types of computing devices have created new opportunities for developing different manners of device authentication. In particular, the advent of flexible display technologies provides for a computing encasement that differs dramatically from the more traditional, inflexible device encasement. In this regard, a flexible display is a display that is flexible in nature; differentiable from the more prevalent traditional flat screen displays used in most electronics devices.

BRIEF SUMMARY OF THE INVENTION

Embodiments of the present invention address deficiencies of the art in respect to device authentication and provide a novel and non-obvious method, system and computer program product for device authentication in a flexible display computing device. In an embodiment of the invention, a method for device authentication in a flexible display computing device includes pre-storing in memory of a computing device, data corresponding to a pattern of folds of a flexible display of the computing device. The method also includes receiving a subsequent authentication request in the computing device and, in response, monitoring a folding of the flexible display and computing data corresponding to a pattern of the monitored folding. The method yet further includes comparing in the memory of the computing device the computed data to the pre-stored data. Finally, the method includes granting access to the computing device if the pattern of the monitored folding compares to the pattern of folds based upon a threshold degree of equality between the computed data and the pre-stored data.

In a different embodiment of the invention, a data processing system is configured with a flexible display and adapted for device authentication. The system includes a computing device with memory and at least one processor and a display coupled to the device. The system also includes an authentication module executing in the memory of the device. The module includes program code enabled upon execution in the device to respond to an authentication request in the computing device by monitoring a folding of the flexible display and computing data corresponding to a pattern of the monitored folding in response to the authentication request, by comparing in the memory of the computing device the computed data to pre-stored data corresponding to a pattern of folds of the flexible display, and by granting access to the computing device if the pattern of the monitored folding compares to the pattern of folds based upon a threshold degree of equality between the computed data and the pre-stored data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for device authentication in a flexible display computing device. In accordance with an embodiment of the invention, a folding pattern of a flexible display can be pre-stored in connection with the authentication of a corresponding computing device incorporating the flexible display. Thereafter, in response to a request to access the corresponding computing device, a folding pattern resulting from a folding of the flexible display can be identified and compared to the pre-stored pattern. To the extent that the identified folding pattern favorably compares to the pre-stored pattern, access to the computing device can be permitted as requested. In this way, the ability of the flexible display to be folded can be leveraged in an authentication process.

Figure 1:
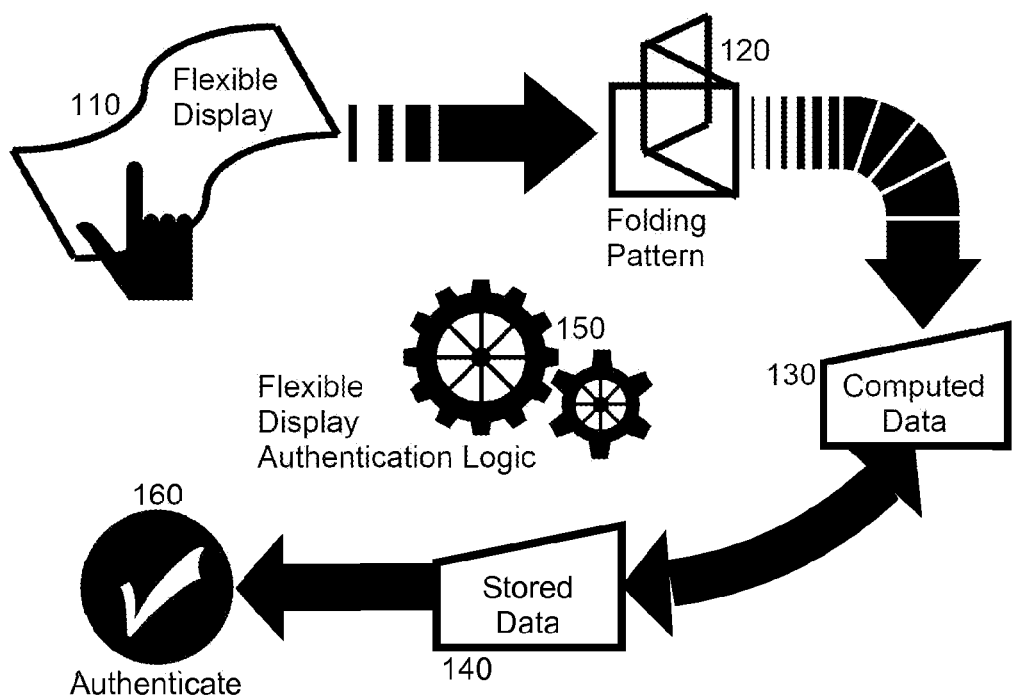
FIG. 1 is a pictorial illustration of a process for device authentication in a flexible display computing device.

In further illustration, FIG. 1 pictorially shows a process for device authentication in a flexible display computing device. As shown in FIG. 1, in response to a request to authentication into a flexible computing device (not shown), a flexible display 110 of the flexible computing device can be folded according to a folding pattern 120, each fold of the folding pattern 120 occurring along a straight line of a plane defined by a plane of the flexible display 110. Flexible display authentication logic 150 thereafter can compute a data representation of the folding pattern 120, for example by way of a set of coordinates of a line representing the fold, or data describing the location of the fold relative to another portion of the flexible display 110 or an image displayed thereon. Subsequently, the logic 150 can compare the computed data 130 to stored data 140 representative of a previously determined folding pattern. To the extent the computed data 130 and the stored data 140 match within a threshold value or set of threshold values, the flexible display authentication logic 150 can authentic the attempt to access the flexible computing device.

Figure 2:
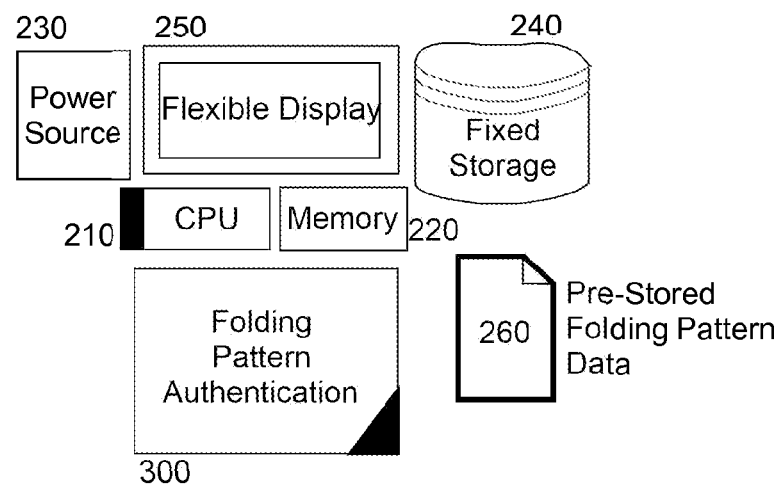
FIG. 2 is a schematic illustration of a data processing system configured for device authentication in a flexible display computing device; and, FIG. 3 is a flow chart illustrating a process for device authentication in a flexible display computing device.

The process described in connection with FIG. 1 can be implemented in a data processing system configured for flexible display authentication. In further illustration, FIG. 2 schematically shows a data processing system configured for device authentication in a flexible display computing device. The system can include one or more processors 210 coupled to memory 220, a power source 230 and fixed storage 240 so as to provide general computational functionality. The system also can include a flexible display 250 powered by the power source 230 and managed by program code in the memory 220 through instructions performed by the one or more processors 210. In this regard, the flexible display 250 can be a rollable or curvable display built upon, by way of example, not a glass substrate but a plastic substrate to as to afford flexibility and bendability to the underlying display.

Of note, a folding pattern authentication module 300 can execute in the memory of 220 the data processing system. The folding pattern authentication logic 300 can include program code that when executed in the memory 220, is enabled to store pre-stored data 260 in the fixed storage 240 in respect to one or more predetermined folding patterns of the flexible display 250. Thereafter, in response to a request by an end user to authenticate into the data processing system, the program code of the folding pattern authentication module 300 can compute data corresponding to a contemporaneously applied folding pattern to the flexible display 250 by the end user and the program code of the folding pattern authentication module 300 can compare the computed data to the pre-stored data 260. To the extent the computed data compares equivalently to the pre-stored data 260 at least within a threshold, access can be granted to the end user into the data processing system.

Figure 3:
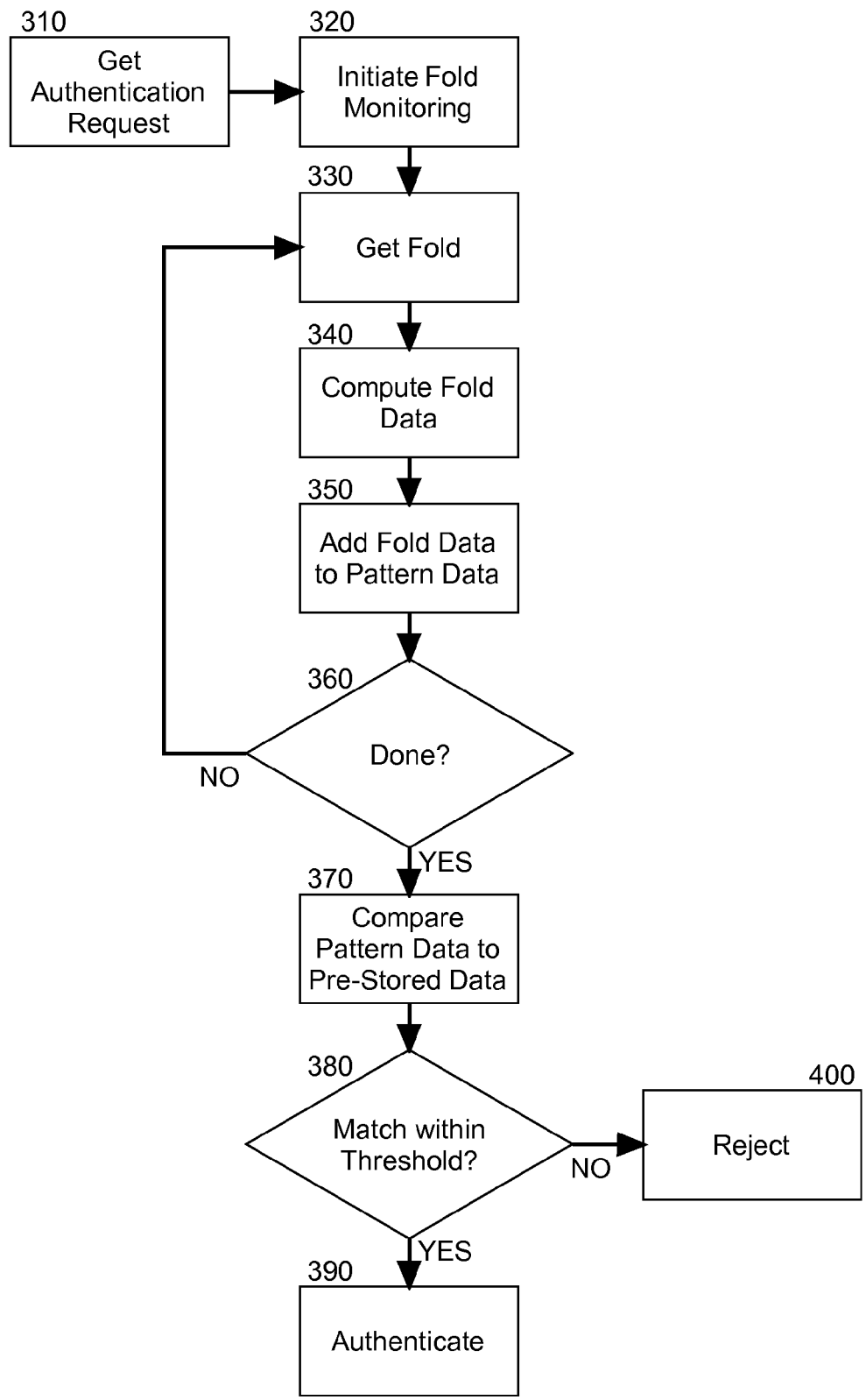

In even yet further illustration of the operation of the folding pattern authentication module 300, FIG. 3 is a flow chart illustrating a process for device authentication in a flexible display computing device. Beginning in block 310, an authentication request can be received from an end user to access a flexible display computing device. In response to the request, the end user can be prompted to initiate a series of pre-determined folds on a flexible display of the computing device in a folding pattern in lieu of providing a password. Thereafter, in block 320, the folding of the flexible display can be monitored.

In block 330 a first fold of the flexible display can be detected and in block 340 corresponding data can be computed, for example by storing a set of coordinates corresponding to a line defined by the fold, or by storing data points indicative of a position of the line defined by the fold relative to a portion of the flexible display—for instance relative to a portion of an image displayed on the flexible display. In block 350 the computed data can be added to data corresponding to a contemporaneously detected folding pattern and in decision block 360, of the folding of the flexible display has not completed, the process can return to block 330.

In decision block 360, when no further folds of the flexible display are detected, in block 370 the data corresponding to the contemporaneously detected folding pattern can be compared to pre-stored data representative of a pre-determined folding pattern. If in decision block 380 the pre-stored data matches the data corresponding to the contemporaneously detected folding pattern within a threshold value to allow for some variation in folding, in block 390 the end user can be authenticated to access the flexible display computing device. Otherwise, access to the end user can be denied.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for device authentication in a flexible display computing device, the method comprising:
    pre-storing in memory of a computing device, data corresponding to a pattern of folds of a flexible display of the computing device;
    receiving a subsequent authentication request in the computing device;
    monitoring a folding of the flexible display and computing data corresponding to a pattern of the monitored folding in response to the authentication request;
    comparing in the memory of the computing device the computed data to the pre-stored data; and,
    granting access to the computing device if the pattern of the monitored folding compares to the pattern of folds based upon a threshold degree of equality between the computed data and the pre-stored data.

2. The method of claim 1, wherein the computed data and the pre-stored data relate to coordinates of different folds of the flexible display.

3. The method of claim 1, wherein the computed data and the pre-stored data relate to locations of different folds of the flexible display relative to image features of an image displayed on the flexible display.

4. The method of claim 2, wherein the threshold degree of equality allows for a specified disparity between coordinates for the pre-stored data and coordinates for the computed data.

5. The method of claim 3, wherein the threshold degree of equality allows for a specified disparity between locations of the different folds relative to the image features for the pre-stored data and locations of the different folds relative to the image features for the computed data.

6. A data processing system configured with a flexible display and adapted for device authentication, the system comprising:
   a computing device with memory and at least one processor;
   a display coupled to the device; and,
   an authentication module executing in the memory of the device, the module comprising program code enabled upon execution in the device to respond to an authentication request in the computing device by monitoring a folding of the flexible display and computing data corresponding to a pattern of the monitored folding in response to the authentication request, by comparing in the memory of the computing device the computed data to pre-stored data corresponding to a pattern of folds of the flexible display, and by granting access to the computing device if the pattern of the monitored folding compares to the pattern of folds based upon a threshold degree of equality between the computed data and the pre-stored data.

7. The system of claim 6, wherein the computed data and the pre-stored data relate to coordinates of different folds of the flexible display.

8. The system of claim 6, wherein the computed data and the pre-stored data relate to locations of different folds of the flexible display relative to image features of an image displayed on the flexible display.

9. The system of claim 7, wherein the threshold degree of equality allows for a specified disparity between coordinates for the pre-stored data and coordinates for the computed data.

10. The system of claim 8, wherein the threshold degree of equality allows for a specified disparity between locations of the different folds relative to the image features for the pre-stored data and locations of the different folds relative to the image features for the computed data.

11. A computer program product for device authentication, the computer program product comprising a non-transitory computer readable storage medium having program instructions embodied therewith, the program instructions executable by a device to cause the device to perform a method comprising:
   pre-storing, by a device, in memory of the device, data corresponding to a pattern of folds of a flexible display of the device;
   receiving, by the device, a subsequent authentication request in the computing device;
   monitoring, by the device, a folding of the flexible display and computing data corresponding to a pattern of the monitored folding in response to the authentication request;
   comparing, by the device, in the memory of the computing device the computed data to the pre-stored data; and,
   granting access to the flexible display, by the device, if the pattern of the monitored folding compares to the pattern of folds based upon a threshold degree of equality between the computed data and the pre-stored data.

12. The computer program product of claim 11, wherein the computed data and the pre-stored data relate to coordinates of different folds of the flexible display.

13. The computer program product of claim 11, wherein the computed data and the pre-stored data relate to locations of different folds of the flexible display relative to image features of an image displayed on the flexible display.

14. The computer program product of claim 12, wherein the threshold degree of equality allows for a specified disparity between coordinates for the pre-stored data and coordinates for the computed data.

15. The computer program product of claim 13, wherein the threshold degree of equality allows for a specified disparity between locations of the different folds relative to the image features for the pre-stored data and locations of the different folds relative to the image features for the computed data.

* * * * *